United States Patent [19]

Smallwood

[11] 4,073,313
[45] Feb. 14, 1978

[54] VALVE APPARATUS

[75] Inventor: John J. Smallwood, King, N.C.

[73] Assignee: Fairchild Industries, Inc., Germantown, Md.

[21] Appl. No.: 530,186

[22] Filed: Dec. 6, 1974

[51] Int. Cl.² .............. F16K 11/04; F16K 31/365
[52] U.S. Cl. .................. 137/625.6; 137/269; 137/271; 137/625.5
[58] Field of Search ............ 137/269, 271, 625.5, 137/625.6, 625.61; 251/28, 31, 33, 29

[56] References Cited

U.S. PATENT DOCUMENTS

| | | | |
|---|---|---|---|
| 1,623,557 | 4/1927 | Rybeck | 137/625.27 |
| 2,829,858 | 4/1958 | Williams | 251/28 |
| 3,457,956 | 7/1969 | Andrews | 137/625.61 |
| 3,521,850 | 7/1970 | German | 251/28 |
| 3,565,101 | 2/1971 | Aslan | 137/625.6 X |
| 3,575,211 | 8/1971 | Wagner | 251/31 X |
| 3,670,771 | 6/1972 | Dewberry | 137/625.6 |
| 3,746,401 | 7/1973 | Stearns | 137/624.27 X |

FOREIGN PATENT DOCUMENTS 1,239,511   4/1967   Germany .......................... 137/625.5

Primary Examiner—Alan Cohan
Assistant Examiner—Gerald A. Michalsky
Attorney, Agent, or Firm—Michael W. York

[57] ABSTRACT

Valve apparatus including a generally cylindrical valve body member and at least one pilot valve located at the end of the valve body member. A supply valve is located within the valve body member and the supply valve and the pilot valve permit the non-throttling interruption of fluid flow as well as permitting the fluid flow pressure to maintain the supply valve in a positive or locked position. The non-throttling and locked operational features are made possible by the relationships of various areas upon which pressures are exerted and the supply pressure. Various embodiments of the invention are presented and these embodiments have convertible components which permit them to be converted into various types of operational configurations.

8 Claims, 4 Drawing Figures

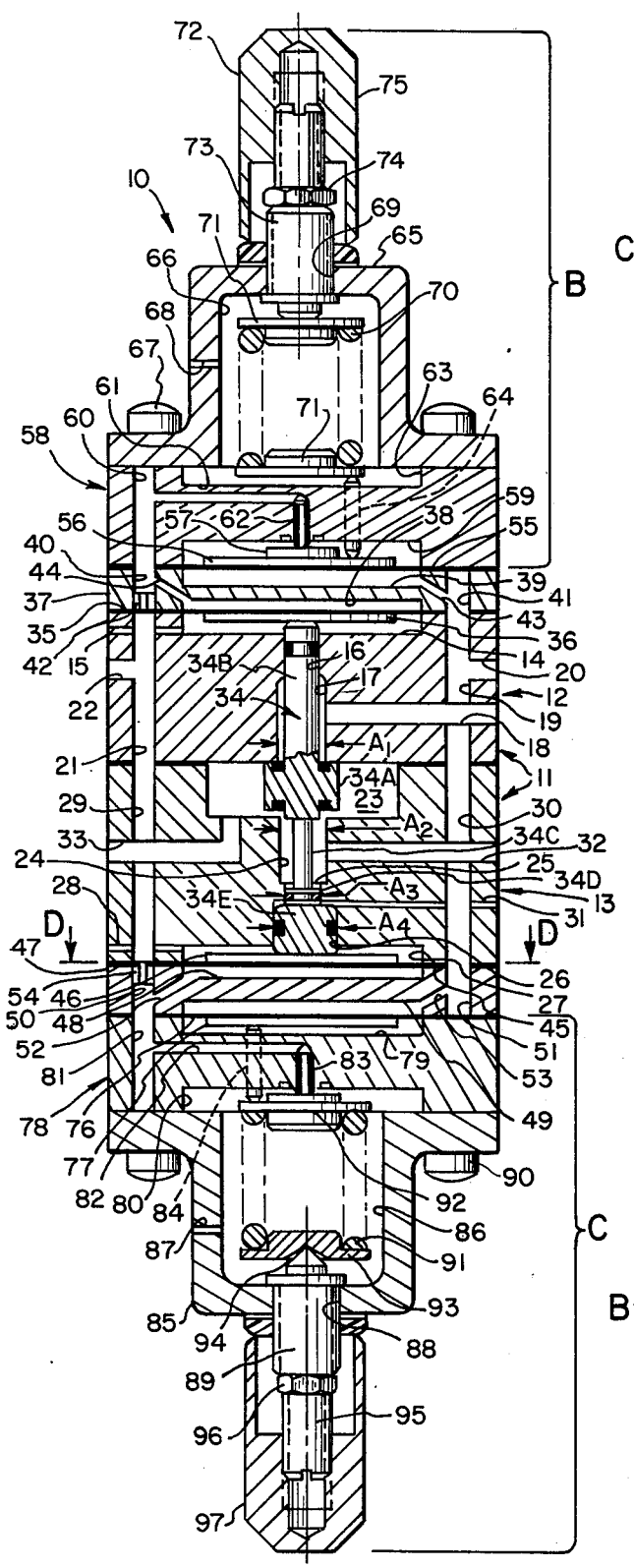
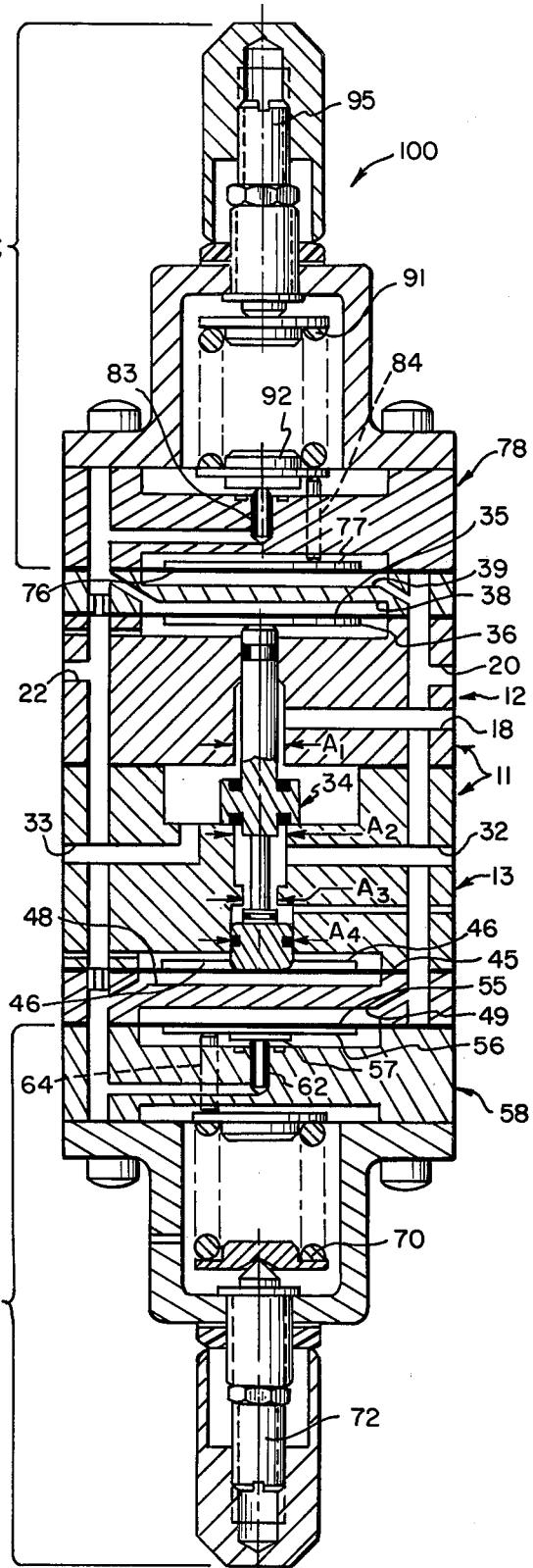
FIG. 1
FIG. 2

VALVE APPARATUS

BACKGROUND OF THE INVENTION

In many circumstances in which valves are needed it is desirable to employ a valve whose operation occurs rapidly and without any throttling effect upon the fluid which is being controlled. Once valve operation has occurred, it is also desirable in many situations to have some assurance that the valve will not open or close except when valve operation is desired.

It is also desirable in certain operations to have a valve which will open or close within an upper and a lower limit and the value of such a valve is generally increased if the upper and lower operational limits are variable over wide ranges. The value of a valve is also increased if it can be converted from one type of operation to another.

The present invention has the previously mentioned desirable features and it provides valve apparatus which are capable of being used in normally closed, normally open, diverting, and manual reset modes or operational configurations.

BRIEF DESCRIPTION OF THE INVENTION

This invention relates to valve apparatus and more particularly to valve apparatus which is capable of positive operation.

It is an object of the present invention to provide valve apparatus which is capable of non-throttling operation.

It is also an object of the present invention to provide valve apparatus in which the pressure of the fluid which is controlled assists in the positive operation of the valve apparatus.

It is also an object of the present invention to provide valve apparatus which is capable of differential operation.

It is also an object of the present invention to provide valve apparatus that is capable, by means of adjustments, of differential operation over a range of pressures.

It is a further object of the present invention to provide valve apparatus which is convertible from one type of operation to another.

It is also an object of the present invention to provide valve apparatus which has components that are interchangeable between various embodiments.

It is a further object of the present invention to provide valve apparatus in which the areas upon which the pressure of the fluid which is being controlled assist in the proper operation of the valve apparatus.

The present invention provides valve apparatus which includes a valve body, supply valve means located within the valve body for controlling fluid supplied to the valve body and at least one signal valve associated with the valve body for controlling the operation of the supply valve means.

BRIEF DESCRIPTION OF THE DRAWINGS

The invention will be hereinafter more fully described with reference to the accompanying drawings in which:

FIG. 1 is a substantially cross sectional view of a normally open valve which is one embodiment of the present invention;

FIG. 2 is a substantially cross sectional view of a normally closed valve which is an additional embodiment of the present invention;

DETAILED DESCRIPTION OF THE PREFERRED EMBODIMENTS

Figure 3:
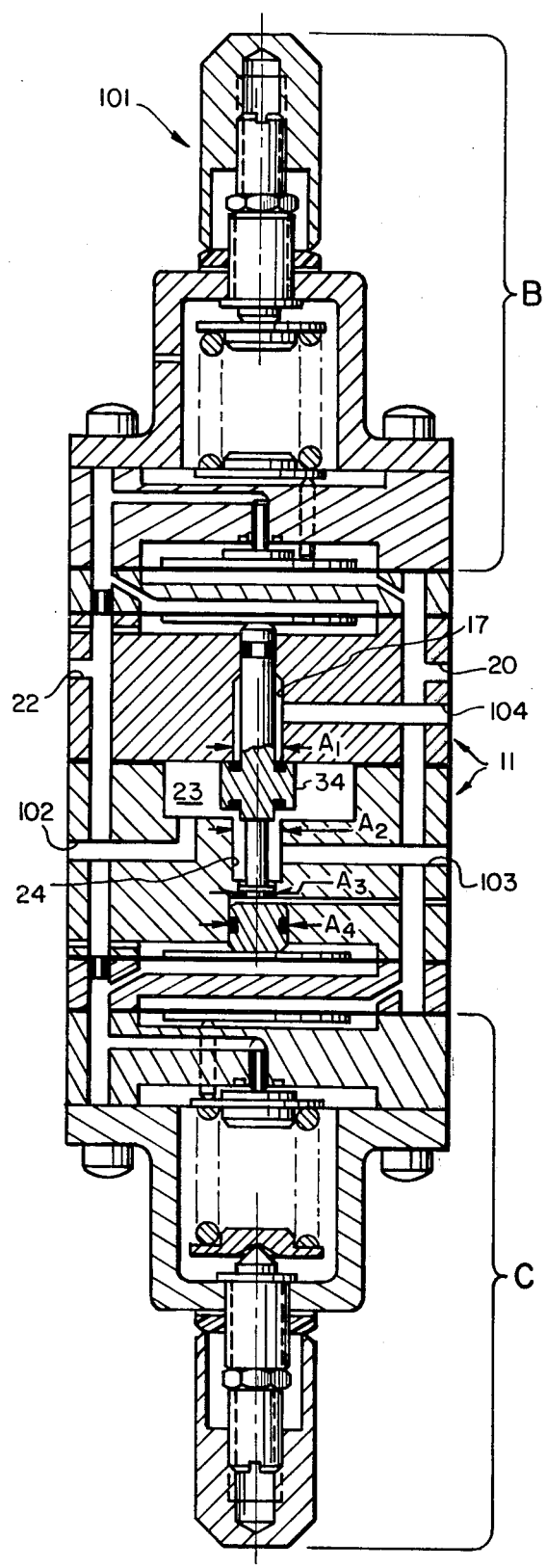
FIG. 3 is a substantially cross sectional view of a diverting valve which represents a further embodiment of the present invention.

Referring first to FIG. 1, the normally open valve apparatus is illustrated and is designated generally by the reference number 10. The valve apparatus 10 comprises a central section 11 which is formed by two adjacently located substantially cylindrical members 12 and 13. The body member 12 has a generally cylindrical shallow depression located in its upper surface which is designated by the numeral 14. A vent hole 15 extends inward from the exterior of the body member 12 into the side of the depression 14 and another aperture 16 extends upward and into the bottom of the depression 14. The aperture 16 also extends downward and joins another aperture 17 in the body member 12 and another aperture 18 which serves as an exhaust port extends from the sidewall of the aperture 17 outward to the exterior of the body member 12. Another aperture 19 extends downwardly from the upper surface of the body member 12 into the lower surface of the body member. This aperture 19 is located close to the exterior surface of the body member 12 and a comparatively short aperture 20 extends from the wall of the aperture 19 to the exterior surface of the body member. Another aperture 21 is located generally opposite the aperture 19 and it extends downward from the upper surface of the body member 12 to its undersurface. Another short aperture 22 extends from the outer surface of the body member 12 inward to the aperture 21 and the aperture 22 serves as a supply port for the valve apparatus.

The valve body member 13 has a centrally located cylindrical depression 23 located in its upper surface. Another aperture 24 extends downwardly from the central portion of the depression 23. The lower end of the aperture 24 in turn is connected to a short smaller diameter aperture 25 which in turn is connected to the upper end of a larger diameter aperture 26. The lower end of the aperture 26 is connected to the central portion of a large shallow cylindrical depression 27 and a vent hole 28 extends outward from the wall of the depression 27, to the exterior of the body member 13. The valve body member 13 has two oppositely located apertures 29 and 30 which extend from the upper surface of the valve body member 13 to its lower surface and the upper end of the apertures 29 and 30 are connected respectively with the lower end of the apertures 21 and 19 located in the body member 12. The body member 13 is also provided with a vent hole 31 which extends outwardly from the upper portion of the wall of the aperture 26 to the exterior of the valve body member 13. An inlet port 32 extends from the exterior of the body member 13 to the aperture 24 and an outlet port 33 extends from the exterior of the body member 13 to the bottom of the depression 23.

A valve member 34 is located within the various chambers of the apertures in both the body member 12 and body member 13. The flow valve member 34 has a centrally located enlarged portion 34A which is cylindrically shaped and this enlarged portion is located within the chamber which is formed by a cylindrical depression 23 and the lower surface of the valve body member 12. The supply valve member 34 also has a generally cylindrical upper portion 34B, a smaller diameter that extends upward from the upper surface of the enlarged portion 34A. This upper portion 34B is located within the apertures 17 and 16. A small diameter cylindrical projection 34C extends downward from the under side of the enlarged portion 34A through the aperture 24 and the lower end of this projection is connected to the upper end of an enlarged cylindrical portion 34D which rides in the aperture 25. This portion 34D is in turn connected to an enlarged portion 34E which rides in the aperture 26. It should be noted that a part of the portion 34E extends into the depression 27 and that in a similar manner the portion of the upper member 34B extends into the depression 14 in the body member 12. As illustrated, various seals are provided to provide for sealing between the upper member 34B and the aperture 16, between the portion 34D and the aperture 25 and between the portion 34E and the aperture 26. In addition the seals are provided on the upper and lower surfaces of the enlarged portion 34A so that with appropriate movement of the flow valve member 34 the aperture 17 can be sealed from the chamber formed by the depression 23 and the under surface of the body member 12 and that the aperture 24 can also be sealed from this chamber.

A diaphragm 35 is located across the upper surface of the body member 12. This diaphragm 35 extends across depression 14 and a thin flat piston member 36 is centrally located on the lower side of the diaphragm. This piston member is in contact with the upper surface of the portion 34B of the flow valve member 34. Suitable apertures are provided in the diaphragm 35 so that the diaphragm does not close off and seal the upper ends of the apertures 19 and 21.

An upper generally cylindrical plate member 37 is located on top of the diaphragm 35. This upper plate member 37 has a generally cylindrical depression 38 in its lower surface whose dimensions generally coinside with the dimensions of the depression 14 in the body member 12. The plate member 37 has another depression 39 in its upper surface and its dimensions also generally correspond to the dimensions of the depression 14 in the body member 12. The plate member 37 also has apertures 40 and 41 which extend downwardly from its upper to its lower surface and these apertures 40 and 41 are generally aligned with the respective apertures 21 and 19 which are located in the valve body member 12. It should also be noted that a fixed orifice member 42 is swaged into position in the aperture 40. In addition, another aperture 43 extends downward from the depression 39 into the aperture 41 and an aperture 44 extends downward from the aperture 40 to the depression 38.

Another diaphragm 45 is located on the other side of the valve body member 13 and this aperture covers the underside of the depression 27. A thin piston member 46 is located on the upper surface of the diaphragm 45 and this piston member is in contact with the lower end of the flow valve portion 34E. Another plate member 47 is located immediately below the diaphragm 45 and this plate member has a generally cylindrical shaped depression 48 located in the upper surface whose dimensions are substantially the same as the depression 27 in the valve member 13. The plate member 47 has a similarly dimensioned depression 49 located in its under surface. Two apertures 50 and 51 are also provided in the plate member and these apertures extend from the upper surface of the plate member to its under surface. These apertures 50 and 51 are generally aligned with the respective apertures 29 and 30 in the valve body member 13. An aperture 52 extends downward from the depression 48 into the aperture 50 and in a similar manner another aperture 53 extends upward from the depression 49 to the aperture 51. It should also be noted that a fixed orifice member 54 is swaged into position in the aperture 50.

A diaphragm 55 is located on top of the plate member 37 and it extends across the depression 39. This diaphragm 55 has a piston member 56 located on its upper surface and there is an additional contact member 57 located on top of the piston member. The diaphragm 55 is provided with a suitable aperture so that it will not block the upper end of the apertures 40 and 41.

A signal valve body member 58 and the body member is located immediately on top of the diaphragm 55 and the body member is provided with a depression 59 in its under surface into which the members 56 and 57 extend. An aperture 60 extends through the body member 58 from its upper to its lower surface and this aperture is so located that it coincides with its aperture 40 of the member 37. Another aperture 61 extends horizontally from the aperture 60 into the central portion of the signal body member 58 and hollow tube member 62 extends downwardly from the inner end of the aperture 61 and into the central portion of the depression 59. A generally cylindrical depression 63 is also located in the upper surface of the signal valve body member 58. Three generally cylindrical positioning pin members 64 (one of which is shown) are slidably mounted within a aperture which extends from the bottom of the depression 63 to the depression 59. The lower end of the members 62 and 64 come into contact with the upper surfaces of the respective members 57 and 56.

A bonnet 65 is located immediately above the signal valve body member 58 and the bonnet has a rather large cylindrical shaped cavity 66. The bonnet 65 is secured to the signal body member 58 by the bolts 67 and the bonnet has a vent hole 68 and a threaded centrally located aperture 69. A signal valve spring 70 is located within the cavity 66 and located on each end of the signal valve spring is a spring retainer 71. The lower spring retainer 71 is in contact with the upper end of the pin 64 and the upper spring retainer 71 is in contact with the lower tip of an adjusting screw 72. The adjusting screw 72 itself is threaded into a locking member 73 which is in turn threaded into the aperture 69 and a locking nut 74 is provided to enable the adjusting screw to be locked in position. A cap 75 is also provided which is adapted to be threaded on the upper end of the adjusting screw 72 to cover the adjusting screw so that it cannot be tampered with.

Located immediately below the plate member 47 is a diaphragm 76 and a disc shaped piston member 77 is located on the underside of the diaphragm. A signal valve body member 78 is located immediately below the diaphragm 76 and the signal valve body member has a centrally located shallow cylindrical shaped depression 79 in its upper surface. Another cylindrical shaped shallow depression 80 is located in the under surface of the signal valve body member 78. An aperture 81 is provided in the outer portion of the signal valve body member 78 and the upper end of this aperture coincides with the aperture 50 in the plate member 47. Another aperture 82 extends inwardly from the aperture 81 to the interior of the signal valve body member where it meets the centrally located hollow tube member 83 which extends into the depression 80. Three generally cylindrical pin positioning members 84 (one of which is shown) are slidably mounted in an aperture which extends from the depression 79 to the depression 80 in the signal valve body member 78.

A bonnet 85 is located immediately below the signal valve body member 78 and the bonnet has a large centrally located cylindrical cavity 86 which is vented to the atmosphere by virtue of the vent hole 87. The bonnet 85 is provided with a threaded aperture 88 into which is threaded a locking member 89. The bonnet 85 is secured to the signal valve body member 78 by the screw 90. Located within the cavity 86 is a signal valve spring 91. The upper end of the signal valve spring 91 is provided with a spring guide member 92 which is in contact with the lower end of the tube 83 and the lower end of the pin 84. The lower end of the spring 91 is also provided with a spring guide member 93 and this spring guide member has a centrally located conical depression 94 in its lower surface. An adjusting screw 95 is threaded into the locking member 89 and the upper pointed end of the screw engages the depression 94. A locking nut 96 is provided around the adjusting screw 95 in order to lock the adjusting screw in position. A cap 97 is adapted to threadably engage the lower end of the adjusting screw 95 and to cover the adjusting screw so that it cannot be tampered with.

It is important for the proper operation of the valve apparatus of the present invention that there be certain area relationships between various parts of the valve apparatus. In particular, it is mandatory that the area $A_1$, or the area of the cross section of the exhaust valve aperture 17 be greater than the area $A_3$, which is the area of the cross section of the locking piston isolation aperture 25 and that the area $A_4$ which is the area of the cross section of the locking piston member 34E or the cross section of the aperture 26 be greater than the area $A_2$ which is the area of the cross section of the inlet valve aperture 24. This is necessary to insure the supply valve member 34 will stay in its proper position after it is activated. It has also been unexpectedly determined that for the best operation of the valve apparatus of the present invention that these various areas should be related substantially in accordance with the following equations:

$$A_1 = A_3 + 0.03$$

$$A_4 = A_2 + 0.03$$

The valve apparatus 10 illustrated in FIG. 1 is normally utilized in the following manner. A suitable fluid is introduced into the supply port 22 thru apparatus which are well known in the art. This fluid passes into the aperture 21 and from there into the aperture of the fixed orifice member 42 into the aperture 40 and then 60. From the aperture 60 the fluid then passes thru the aperture 61 and through the aperture of the tube member 62 into the chamber formed partially by the depression 59 if permitted by the position of the member 57. At the same time, the supply fluid also passes from the aperture 21 into the aperture 29 and through the fixed orifice member 54 into the aperture 50 and the aperture 81. From the aperture 50, the fluid then passes through the aperture 52 into the chamber which is partially formed by the depression 48. The fluid in the aperture 81 also passes through the aperture 82 and then through the aperture of the tube member 83. It will, also be noted that the pressure of the fluid supplied through the supply port 22 acts against the diaphragm 35 and its connected piston 36 which rests upon the upper end of the flow valve pintal member 34 since fluid flows through the aperture 44 into the depression 38. It will also be noted that the pressure of the fluid supplied through the supply port 22 acts against the diaphragm 45 and its associated piston 46 since fluid flows through the aperture 52 into the depression 48. The piston 46 in turn exerts a pressure against the lower end of the pintal member 34.

The operation of the valve apparatus 10 is controlled by a signal fluid being introduced into the signal port 20. From the port 20 the fluid passes to the aperture 19 and from there to the aperture 41 and to the aperture 43. From the aperture 43 the fluid then passes into chamber which is partially formed by the depression 39. The pressure of the fluid in the chamber which is partially formed by the depression 39 exerts an upward force on the diaphragm 55 and its associated members 56 and 57. This upward force is opposed by downward pressure exerted by the spring 70 through the pin 64. The fluid in the aperture 19 also passes downward into the apertures 30 and 51. From the aperture 51 the fluid then passes through the apertures 53 and into the chamber which is partially formed by the depression 49. The pressure of the fluid in the chamber which is partially formed by the depression 49 exerts a downward force against the diaphragm 76 and its associated piston member 77. This downward force is opposed by an upward force which is exerted by the spring 91 through the pin 84.

When the pressure of the fluid which is introduced through the signal port 20 exceeds a certain fixed value which is determined by the setting of the adjusting screw 72, the pressure in the chamber which is partially formed by the depression 39, causes the diaphragm 55 and its associated piston members 56 and 57 to move upward. As the piston member 57 moves downward, it seals the end of the tube 62 and this causes the pressure in the chamber partially formed by the depression 38 to increase. As a consequence, the diaphragm 35 and its associated piston 36 push upon the upper end of the pintle 34 causing it to move downward and into its closed position with the enlarged portion 34A having its lower shoulder resting against the shoulder at the entrance of the aperture 24. As a consequence, the flow of fluid from the intake port 32 to the outlet port 33 is an interrupted. At this time, pressure in the outlet 33 is exhausted through the exhaust port 18.

On the other hand, if the pressure of the fluid which is introduced through the signal port 20 drops below a certain preset value, then the pressure of the fluid which is in the chamber that is partially formed by the depression 39 also drops and this permits a diaphragm 55 and its associated piston members 56 and 57 to move downward as a result of the action of the spring 70 whose force is exerted through the pin 64. When this occurs, supply fluid which is in the aperture 61 flows through the tube member 62 and into the chamber which is partially formed by the depression 59. This in turn results in a lowering of the pressure of the supply fluid which is in the chamber that is partially formed by the depression 38 which results in a diaphragm 35 and its associated piston member 36 moving in an upward direction. In addition, the pressure in the chamber partially formed by the depression 49 is lowered which causes the spring 91 through pin 84 to move the piston member 77 and diaphragm 76 in an upward direction allowing the member 92 to close the end of the tube 83. As a consequence, the pressure in the chamber partially formed by the depression pressure from the fluid in the signal port 48 increases and this pushes the diaphragm 45 and the piston member 46 upward to move the pintle 34 to its open position to allow fluid to flow from port 32 to port 33. In addition, the pintle closes the ports 17 and 18. Consequently, fluid flow is controlled between two preset upper and lower limits which are determined by the settings of the adjusting screws 72 and 95 which control the action of the respective springs 70 and 91.

FIG. 2 illustrates a normally closed valve apparatus 100 which is another embodiment of the invention. The normally closed valve apparatus 100 is very similar to the previously described valve apparatus 10 and it uses similar parts. However, the components of the upper high pressure pilot valve assembly, designated by the letter B, which includes the diaphragm 55, are interchanged with the lower low pressure pilot valve assembly, designated by the letter C, which includes the diaphragm 76. The various components of the normally closed valve apparatus 100, including the components designated by the letters B and C, function in a manner similar to the same components of the valve apparatus 10 illustrated in FIG. 1. However, in view of the interchange of the components designated by the letters B and C, the valve pintle 34 is normally in its closed position as indicated in FIG. 2.

Except for the interchange of the above-indicated components, all of the components and their relationships are identical to those illustrated in FIG. 1. When the pressure in the signal port 20 of the embodiment illustrated in FIG. 2 rises above a preset value determined by the adjusting screw 95, the signal fluid pressure which is exerted upward upon the underside of the diaphragm 76 pushes the members 77, 84 and 92 upward which results in the passage of supply fluid through the tube 83 into the interior of the bonnet 85. As a consequence, the supply fluid pressure in the chamber partially formed by the depression 38 drops. In addition the higher pressure in the chamber partially formed by the depression 49 causes the piston member 57 to close the tube 62 and hence pressure in the chamber partially formed by the depression 48 causes the pintle member 34 to move upward to permit fluid flow from the inlet port 32 to the outlet port 33. Then when the pressure in the signal port 20 drops to a preset valve, determined by the adjusting screw 72, the lower pressure in the chamber partially formed by the depression 79 causes the member 92 to move downward and to contact the tube 83 which cuts off the supply fluid flow into the interior of the bonnet 85. As a consequence, supply fluid pressure in the chamber partially formed by the depression 38 increases and the increased pressure in the diaphragm 35 and the piston 36 pushes the pintle member 34 downward to its closed position.

Another embodiment of the invention is illustrated in FIG. 3. This embodiment is a diverting valve 101 in which fluid is diverted or directed to different output ports depending upon the magnitude of the signal pressure in the valve apparatus. This diverting valve apparatus 101 is identical to the structures illustrated in FIG. 1 except that the diverting valve apparatus has an inlet port 102 and an outlet port 103 rather than the inlet port 32 and the outlet port 33 illustrated in FIG. 1. In addition the diverting valve apparatus 101 has an additional outlet port 104 rather than the exhaust port 18 of the embodiment of the invention illustrated in FIG. 1.

The diverting valve apparatus 101 of FIG. 3 functions in the following manner. The operation of the components designated by the letters B and C and the operation of the signal fluid which is supplied to the port 20 are identical to that for the embodiment illustrated in FIG. 1. However, the diverting valve apparatus 101 has the inlet port 102 which leads into the depression 23 that receives the fluid which is to be controlled and this fluid then normally passes into the aperture 24 and from there to an outlet port 103. When the pressure of the signal fluid increases above the preset point this causes the valve pintle member 34 to move downward, in the manner described with respect to the embodiment of FIG. 1, and to hence cut off the flow of fluid from the inlet port 102 to the outlet port 103. Instead, the fluid from the inlet port 102 is diverted into the aperture 17 and from there to the outlet port 104. Then when the signal pressure drops to a preset valve, the valve pintle 34 moves upward and fluid then again flows from the port 102 to the port 103.

Figure 4:
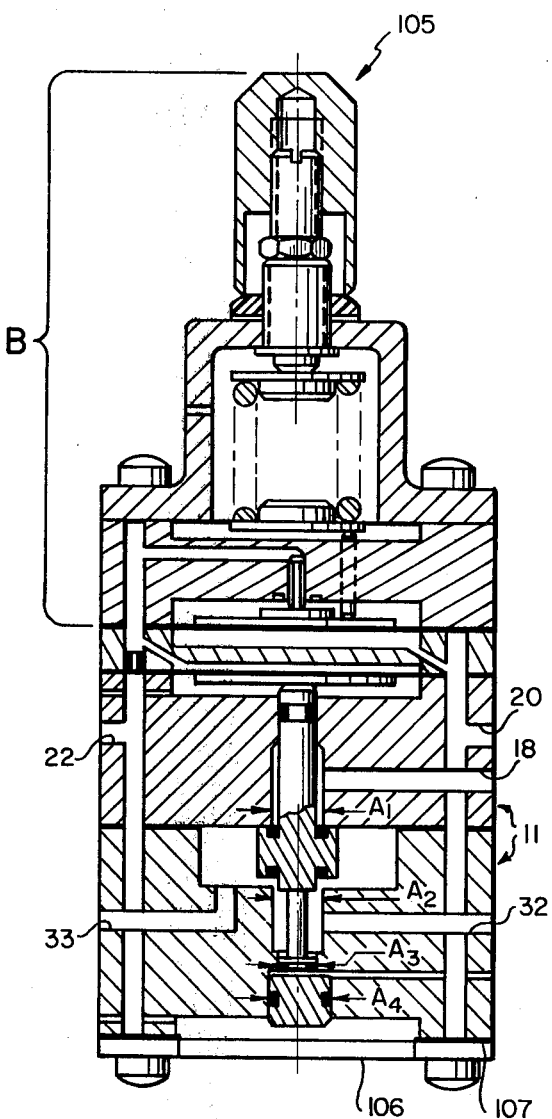
FIG. 4 is a substantially cross sectional view of a valve with manual reset features which represents an additional embodiment of the present invention.

Another embodiment of the invention is illustrated in FIG. 4. The embodiment of the invention illustrated in FIG. 4 is a modification of the embodiment of the invention illustrated in FIG. 1. In this embodiment, which is a manual reset valve apparatus 105, all of the components located below the line D—D in FIG. 1 are removed and a sealing ring 106 which has a central open center portion is installed over a washer shaped gasket 107 as illustrated in FIG. 4. The purpose of this sealing ring 106 is to seal the lower open aperatures 29 and 30 and yet permit access to the valve pintle lower portion 34E which serves as a push bottom for resetting the manual reset valve apparatus 105.

The manual reset valve apparatus 105 functions in a manner similar to that previously described in connection with the embodiment of the invention illustrated in FIG. 1 except that the fluid pressure in the signal port 18 will only cause operation of the valve pintle 34 in a downward direction to its closed position since there are no components below the line D—D in FIG. 1. When the fluid pressure in the signal port 20 increases above a preset valve this causes the normally open valve pintle 34 to move to its closed position in the manner previously described for the embodiment of the invention illustrated in FIG. 1. This valve pintle 34 will then remain in its closed position and prevent fluid flow from the inlet port 32 to the outlet port 33 until the pintle 34 is reset manually by pushing upward on the end of the pintle portion 34E.

It should be appreciated that all of the identical components of the four embodiments of the invention illustrated in FIGS. 1 through 4 are interchangeable. Consequently, a given set of components can be used to assemble a variety of types of valve apparatus.

Although the invention has been described in considerable detail with reference to certain preferred embodiments, it will be understood that variations and modifications may be made within the spirit and scope of the invention as defined in the appended claims.

What is claimed is:

1. Valve apparatus comprising a valve body, said valve body having an inlet and an exhaust valve aperture and a locking piston isolation aperture, supply valve means including a locking piston member located within said valve body for controlling fluid supplied to said valve body, means for isolating said locking piston member from the inlet when the exhaust valve aperture is closed, pressure assist means for permitting the pressure of the fluid controlled by said supply valve means to assist in the positive action of said supply valve means and for permitting the pressure of the fluid being controlled to assist in maintaining said supply valve means in the normally open position, said pressure assist means comprising the exhaust valve aperture and the locking piston isolation aperture where the area of the cross section of the exhaust valve aperture is greater than the area of the cross section of the locking piston isolation aperture, and at least one signal valve associated with said valve body for controlling the operation of said supply valve means.

2. The valve apparatus of claim 1 wherein said valve body has an inlet valve aperture and said pressure assist means further comprises the locking piston member and the inlet valve aperture where the area of the cross section of the locking piston member is greater than the area of the cross section of said inlet valve aperture.

3. The valve apparatus of claim 2 further comprising a second signal valve associated with said valve body and wherein one of said signal valves is adapted to operate at a high pressure point and the other signal valve is adapted to operate at a low pressure point.

4. The valve apparatus of claim 3 further comprising means associated with each of said signal valves for independently adjusting the pressure point at which each of said signal valves operate and only one signal fluid means located in said valve body for causing said supply valve means to operate between signal pressure values determined by the adjustment of each of said independently adjusting pressure point means.

5. Diverting valve apparatus comprising a valve body, said valve body having an inlet port and inlet valve aperture, at least two outlet ports, and a locking piston isolation aperture, supply valve means including a locking piston member located within said valve body for controlling fluid supplied to said valve body, pressure assist means for permitting the pressure of the fluid controlled by said supply valve means to assist in the positive action of said supply valve means and for permitting the pressure of the fluid being controlled to assist in maintaining said supply valve means in the position in which it has been operated, said pressure assist means comprising an aperture leading to one of the outlet ports and the locking piston isolation aperture where the area of the cross section of the aperture leading to the outlet port is greater than the area of the cross section of the locking piston isolation aperture, means for isolating said locking piston member from the inlet port when said aperture leading to one of the outlet ports is closed, and at least one signal valve associated with said valve body for controlling the operation of said supply valve means.

6. The diverting valve apparatus of claim 5 wherein said supply valve means includes a locking piston member and said pressure assist means further comprises the locking piston member and the inlet valve aperture where the area of the cross section of the locking piston member is greater than the area of the cross section of the inlet valve aperture.

7. The diverting valve apparatus of claim 6 further comprising a second signal valve associated with said valve body and wherein one of said signal valves is adapted to operate at a high pressure point and the other signal valve is adapted to operate at a low pressure point.

8. The diverting valve apparatus of claim 7 further comprising means associated with each of said signal valves for independently adjusting the pressure point at which each of said signal valves operate and wherein said valve apparatus has only one signal fluid means located in said valve body for causing said supply valve means to operate between signal pressure values determined by the adjustment of each of said independently adjusting pressure point means.

* * * * *